US011891310B2

(12) United States Patent
Cheng

(10) Patent No.: US 11,891,310 B2
(45) Date of Patent: Feb. 6, 2024

(54) DEGASSING SYSTEM, A DEGASSING TOWER, AND A WATER SYSTEM HAVING THE SAME

(71) Applicant: Changxin Memory Technologies, Inc., Anhui (CN)

(72) Inventor: Yi Chuan Cheng, Hefei (CN)

(73) Assignee: Changxin Memory Technologies, Inc., Hefei (CN)

( * ) Notice: Subject to any disclaimer, the term of this patent is extended or adjusted under 35 U.S.C. 154(b) by 520 days.

(21) Appl. No.: 17/230,878

(22) Filed: Apr. 14, 2021

(65) Prior Publication Data

US 2021/0230019 A1    Jul. 29, 2021

Related U.S. Application Data

(63) Continuation of application No. PCT/CN2019/111979, filed on Oct. 18, 2019.

(30) Foreign Application Priority Data

Oct. 18, 2018   (CN) .......................... 201811216767.2
Oct. 18, 2018   (CN) .......................... 201821691960.7

(51) Int. Cl.
*B01D 19/00*       (2006.01)
*C02F 1/20*        (2023.01)
(Continued)

(52) U.S. Cl.
CPC ............... *C02F 1/20* (2013.01); *B01D 19/00* (2013.01); *B01D 19/0036* (2013.01);
(Continued)

(58) Field of Classification Search
CPC ............... B01D 19/00; B01D 19/0036; B01D 19/0063; B01D 19/0068
See application file for complete search history.

(56) References Cited

FOREIGN PATENT DOCUMENTS

CN          203384013 U      1/2014
CN          203655639 U      6/2014
(Continued)

OTHER PUBLICATIONS

PCT International Search Report and the Written Opinion dated Jan. 19, 2020, issued in related International Application No. PCT/CN2019/111979 (10 pages).

*Primary Examiner* — Robert A Hopkins
(74) *Attorney, Agent, or Firm* — Sheppard Mullin Richter & Hampton LLP

(57) ABSTRACT

The present disclosure provides a pump-assisted degassing system, a vacuum degassing tower, and a water system having the same. The degassing system comprises a vacuum pump, connected with a degassing tower through a main pipeline, and configured to pump out a gas-liquid mixture from the degassing tower; a gas-liquid separator, connected with the vacuum pump in a closed loop through a circulation pipeline, and configured to perform gas-liquid separation on the gas-liquid mixture; and a booster pump, arranged on the main pipeline between the vacuum pump and the degassing tower, and configured to assist the vacuum pump to pump out the gas-liquid mixture. The vacuum pump and the booster pump constitute a two-stage pumping device. Only one vacuum pump is needed in the system, and the vacuum pump requires less circulating water and less motor power resulting in lower the equipment load loss in the operation efficiency.

20 Claims, 2 Drawing Sheets

(51) Int. Cl.
*C02F 101/10* (2006.01)
*C02F 103/02* (2006.01)

(52) U.S. Cl.
CPC ..... *B01D 19/0063* (2013.01); *B01D 19/0068* (2013.01); *C02F 2101/10* (2013.01); *C02F 2103/023* (2013.01); *C02F 2201/005* (2013.01); *C02F 2209/03* (2013.01); *C02F 2209/42* (2013.01); *C02F 2301/063* (2013.01)

(56) References Cited

FOREIGN PATENT DOCUMENTS

| | | |
|---|---|---|
| CN | 104806881 A | 7/2015 |
| CN | 205315265 U | 6/2016 |
| CN | 205779711 U | 12/2016 |
| CN | 207540384 U | 6/2018 |
| CN | 207906081 U | 9/2018 |
| CN | 209438122 U | 9/2019 |
| EP | 0975875 A1 | 2/2003 |
| JP | H03-279696 A | 12/1991 |
| WO | WO-9948588 A1 * | 9/1999 ......... B01D 17/0205 |

* cited by examiner

DEGASSING SYSTEM, A DEGASSING TOWER, AND A WATER SYSTEM HAVING THE SAME

CROSS-REFERENCE TO RELATED APPLICATIONS

This application is a continuation application of International Patent Application No. PCT/CN2019/111979, filed on Oct. 18, 2019, which is based on and claims priority to the Chinese Patent Applications No. 201811216767.2 and 201821691960.7, both filed with the State Intellectual Property Office of P. R. China on Oct. 18, 2018. The entire content of the above-referenced applications are incorporated herein by reference.

TECHNICAL FIELD

The present disclosure relates to a technical field of water treatment equipment, and more specifically, to a pump-assisted degassing system, a vacuum degassing tower, and a water system having the same.

BACKGROUND

In water system treatment processing (i.e., reverse osmosis (RO) to the water system), carbon dioxide ($CO_2$) shall be removed from the water to avoid the influence of the carbonate ($CO_3^{2-}$) to the water quality in subsequent processes. The existing water system usually uses a vacuum degassing tower system to achieve the above functions, which isolates the water from being interfered by extraneous air. The vacuum degassing tower system is equipped with a liquid-sealed vacuum pump (vacuum degree is about 25~35 Torr, wherein 1 Torr≈$1.316 \times 10^{-3}$ standard atmospheric pressure, or 1 Torr≈133.322 Pa), so that the water in the degassing tower system is not polluted from the outside, and the system can circulate continuously.

In the existing vacuum degassing tower system, two single-stage water-sealed vacuum pumps are usually used in combination. Each of single-stage water-sealed vacuum pumps has a large volume of circulating water (about 120 liters per minute, or 120 LPM), and requires a large motor power (about 75 horsepower (HP), and the running current is about 75 amperes (A).) Accordingly, the gas-liquid mixture extracted from the vacuum degassing tower is treated by a plurality of single-stage water-sealed vacuum pumps, resulting in excessive load and substantial loss of operation efficiency of the pump blades.

SUMMARY OF THE DISCLOSURE

The embodiments of the present disclosure overcome the above-discussed deficiencies of the prior art, and provide a pump-assist degassing system that uses a small amount of circulating water, requires a small motor power, and losses less operation efficiency of the vacuum pump blades.

The embodiments of the present disclosure also provide a vacuum degassing tower having the above described pump-assisted degassing system.

The embodiments of the present disclosure further provide a water system having the vacuum degassing tower described above.

To achieve the above embodiments, the present disclosure adopts the following technical solutions.

One aspect of the present disclosure is directed to a pump-assisted degassing system. The pump-assisted degassing system may include: a vacuum pump, connected with a degassing tower through a main pipeline, and configured to pump out a gas-liquid mixture from the degassing tower; a gas-liquid separator, connected with the vacuum pump in a closed loop through a circulation pipeline, and configured to perform gas-liquid separation on the gas-liquid mixture; and a booster pump, arranged on the main pipeline between the vacuum pump and the degassing tower, and configured to assist the vacuum pump to pump out the gas-liquid mixture.

In some embodiments of the present disclosure, the booster pump may be connected with a vacuum pipeline in a closed loop, and the vacuum pipeline may be provided with a vacuum switch.

In some embodiments of the present disclosure, the vacuum pipeline may be further provided with a vacuum gauge.

In some embodiments of the present disclosure, the vacuum pipeline may be further provided with a vacuum breaking valve.

In some embodiments of the present disclosure, the vacuum pipeline may be provided with a bypass valve.

In some embodiments of the present disclosure, in the aforementioned pump-assisted degassing system, when a vacuum gauge shows an abnormal vacuum pressure, the vacuum switch may operate to discharge water from the vacuum pipeline through a bypass valve and a vacuum breaking valve In some embodiments of the present disclosure, the main pipeline may be provided with an inlet valve arranged between the booster pump and the degassing tower to control the connection therebetween.

In some embodiments of the present disclosure, the main pipeline may be provided with a check valve arranged between the booster pump and the vacuum pump to stop backflow from the vacuum pump to the booster pump.

In some embodiments of the present disclosure, the circulation pipeline may be provided with a cooler to cool the gas-liquid mixture.

In some embodiments of the present disclosure, the gas-liquid separator may include a liquid level gauge to maintain a water level of the gas-liquid separator.

In some embodiments of the present disclosure, the vacuum pump may have about 25 horsepower.

In some embodiments of the present disclosure, a required volume of circulating cooling water of the pump-assisted degassing system may be 45 liters per minute.

Another aspect of the present disclosure is directed to a vacuum degassing tower, comprising a tower body and a degassing system disclosed by the present disclosure and described in the above embodiments. The vacuum pump may be connected with an upper portion of the tower body, and may be configured to pump out the gas-liquid mixture from the tower body, and the booster pump is arranged between the vacuum pump and the tower body.

Another aspect of the present disclosure is directed to a water system, comprising the vacuum degassing tower disclosed by the present disclosure and described in the above embodiments.

The above technical solutions show the advantages and positive effects of the pump-assisted degassing system, the vacuum degassing tower, and the water system having the same, according to the embodiments of the present disclosure.

The pump-assisted degassing system disclosed in the present disclosure may comprise a vacuum pump, a gas-liquid separator, and a booster pump. The vacuum pump may be connected to the degassing tower to pump out the gas-liquid mixture from the degassing tower. The gas-liquid separator may be connected with the vacuum pump in a closed loop to perform gas-liquid separation on the gas-liquid mixture. The booster pump may be located between the vacuum pump and the degassing tower to provide assist to the vacuum pump. The vacuum pump and the booster pump may constitute a two-stage pumping device based on mechanical vacuum assist. The vacuum pump may have a small amount of circulating water, and may require a small motor power. Moreover, only one vacuum pump may be needed to treat the gas-liquid mixture pumped out from the vacuum tower, and thus the equipment load may be low, and the loss in the operation efficiency of the blades of the vacuum pump may be reduced.

BRIEF DESCRIPTION OF THE DRAWINGS

The Detailed Description of the embodiments in view of the accompanying drawings will disclose various objectives, features, and advantages of the present disclosure. The drawings are only illustrative diagrams of embodiments of the present disclosure and are not necessarily drew to scale. In the drawings, the same reference numerals indicate the same or similar parts.

LIST OF REFERENCE NUMERALS

Figure 1:
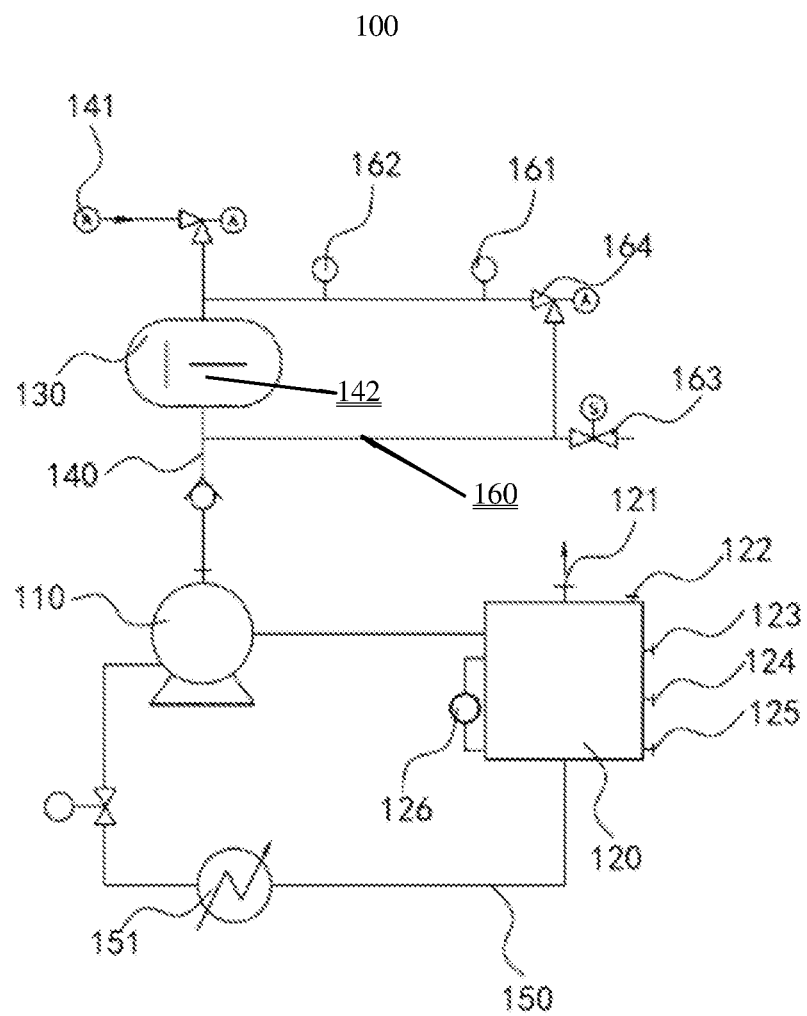
FIG. 1 is a schematic diagram of a pump-assisted degassing system according to an embodiment of the present disclosure.

- 100 pump-assisted degassing system
- 110 vacuum pump
- 120 gas-liquid separator
- 121 outlet
- 122 water supplement hole
- 123 overflow hole
- 124 float valve
- 125 drain hole
- 126 liquid level gauge
- 130 booster pump
- 140 main pipeline
- 141 inlet valve
- 142 check valve
- 150 circulation pipeline
- 151 cooler
- 160 vacuum pipeline
- 161 vacuum switch
- 162 vacuum gauge
- 163 vacuum breaking valve
- 164 bypass valve
- 200 tower body

DETAILED DESCRIPTION

Embodiments of the present disclosure will be described in detail in the following description. It should be understood that the present disclosure can be modified based on various embodiments, which are also protected within the scope of the present disclosure. Description and Drawings are used for illustrating but not limiting the present disclosure.

In the following description of the various embodiments of the present disclosure, references in the drawings are parts of the disclosure, and some different exemplary structures, systems, and steps according to various aspects of the disclosure are provided. It is understood that other specific components, structures, exemplary devices, systems, and steps may be employed, and structural and functional modifications may be made without departing from the scope of the present disclosure. Moreover, although the terms "above", "between", "inside" and the like may be used in the specification to describe various exemplary features and elements of the present disclosure, these terms are used herein for convenience only, for example, the exemplary orientation shown in the figures. The scope of the disclosure shall not be limited to structures only in specific three-dimensional orientations.

Embodiments of Power Assisted Degassing System

Referring to FIG. 1, a schematic diagram of a pump-assisted degassing system according to an embodiment of the present disclosure is shown. According to the embodiment, the pump-assisted degassing system is, for example, implemented as a degassing apparatus applied to a vacuum degassing tower of a water system. Those skilled in the art will appreciate that various modifications, additions, substitutions, and deletions made to the specific embodiments described below in order to apply the related designs of the present disclosure to other types of degassing equipment or other technologies will still be within the scope of the principles of the pump-assisted degassing system disclosed in the present disclosure.

As shown in FIG. 1, according to the present embodiment of the present disclosure, the pump-assisted degassing system 100 is configured to vacuum a degassing tower. Specifically, the pump-assisted degassing system 100 includes a vacuum pump 110, a gas-liquid separator 120, and a booster pump 130. The vacuum pump 110 is connected with the upper portion of the degassing tower through the main pipeline 140, and is configured to pump out a gas-liquid mixture from the degassing tower through the main pipeline 140. The gas-liquid separator 120 is connected with the vacuum pump 110 in a closed loop through the circulation pipeline 150, and is configured to perform gas-liquid separation on the gas-liquid mixture pumped out by the vacuum pump 110. For example, the gas-liquid separator 120 can remove the $CO_2$ gas from the gas-liquid mixture, thereby avoiding the influence of the $CO_3^{2-}$ on the water quality in the subsequent processes. The booster pump 130 is disposed on the main pipeline 140, and is located between the vacuum pump 110 and the degassing tower. The booster pump 130 is configured to provide assist when the vacuum pump 110 pumps the gas-liquid mixture from the degassing tower through the main pipeline 140.

According to the above description, the vacuum pump 110 and the booster pump 130 constitute a two-stage pumping device based on mechanical vacuum assist, and thus the pump-assisted degassing system 100 can use its booster pump 130 to provide assist in a first-stage pumping of the gas-liquid mixture, and then use its vacuum pump 110 to pump the gas-liquid mixture to the gas-liquid separator 120. The booster pump 130 may pump the gas-liquid mixture out of the degassing tower, and send to the vacuum pump 110. The vacuum pump 110 may further pump the gas-liquid mixture to the gas-liquid separator 120. In this case, pumping the gas-liquid mixture from the degassing tower to the gas-liquid separator 120 may be conducted in two stages by the booster pump 130 and the vacuum pump 110, respectively. The load of pumping may be shared by the two pumps, such that the vacuum pump 110 may need a small amount of circulating water, and require a small motor power. Moreover, only one vacuum pump 110 is needed to process the gas-liquid mixture pumped out by the vacuum tower, and thus the equipment load thereof is low, and the loss of the operation efficiency of the blades of the vacuum pump 110 is low.

Further, as shown in FIG. 1, according to the present embodiment, the booster pump 130 is connected with a vacuum pipeline 160 in a closed loop, and is provided with a vacuum device to ensure a vacuum environment for pumping the gas-liquid mixture by the booster pump 130 in conjunction with the vacuum pump 110. Specifically, the vacuum pipeline 160 is provided with a vacuum switch 161, a vacuum gauge 162, a vacuum breaking valve 163, and a bypass valve 164 having a protective function. When the vacuum gauge 162 shows that the vacuum pressure is out of a desired range (i.e., the normal pressure of the vacuum gauge 162 is negative, and if it shows a positive value, the system is abnormal), the vacuum switch 161 operates. The vacuum pump 110 cannot pump the gas-liquid mixture in the degassing tower because of the water overloads. At this time, the vacuum switch 161 may open, and the water can be discharged from the vacuum pipeline 160 through the bypass valve 164 and the vacuum breaking valve 163 to protect the equipment.

Further, as shown in FIG. 1, according to the present embodiment, the gas-liquid separator 120 includes a liquid tank and an outlet 121, a water supplement hole 122, an overflow hole 123, a float valve 124, a drain hole 125, and liquid level gauge 126 disposed on or connected with the liquid tank. The liquid level gauge 126 is used to monitor and maintain the normal water level of the liquid tank. When the liquid level is too low, water can be supplemented through the water supplement hole 122. When the liquid level is too high, the water can flow out through the overflow hole 123. The gas in the liquid tank can be discharged through the outlet 121. The water can be discharged by the drain hole 125 during maintenance.

Further, as shown in FIG. 1, according to the present embodiment, the main pipeline 140 is provided with an inlet valve 141 located between the booster pump 130 and the degassing tower. Accordingly, the pump-assisted degassing system 100 can control the connection between the entire system 100 and the degassing tower through the inlet valve 141, thereby selectively achieving the degassing function.

Further, as shown in FIG. 1, according to the present embodiment, the main pipeline 140 is provided with a check valve 142 located between the booster pump 130 and the vacuum pump 110. The check valve 142 is configured to stop backflow of the main pipeline 140 from the vacuum pump 110 to the booster pump 130.

Further, as shown in FIG. 1, according to the present embodiment, a cooler 151 is provided on the circulation pipeline 150. The cooler 151 is configured to cool the gas-liquid mixture circulating between the vacuum pump 110 and the gas-liquid separator 120 through the circulation pipeline 150.

It should be noted that the pump-assisted degassing system illustrated in the figures and described in the specification is just a few examples of the many types of pump-assisted degassing systems that can employ the principles of the present disclosure. It should be clearly understood that the principles of the present disclosure are not merely limited to any detail of the pump-assisted degassing system 100 illustrated in the drawings or described in the specification or any component of the pump-assisted degassing system.

Embodiment of Vacuum Degassing Tower

Figure 2:
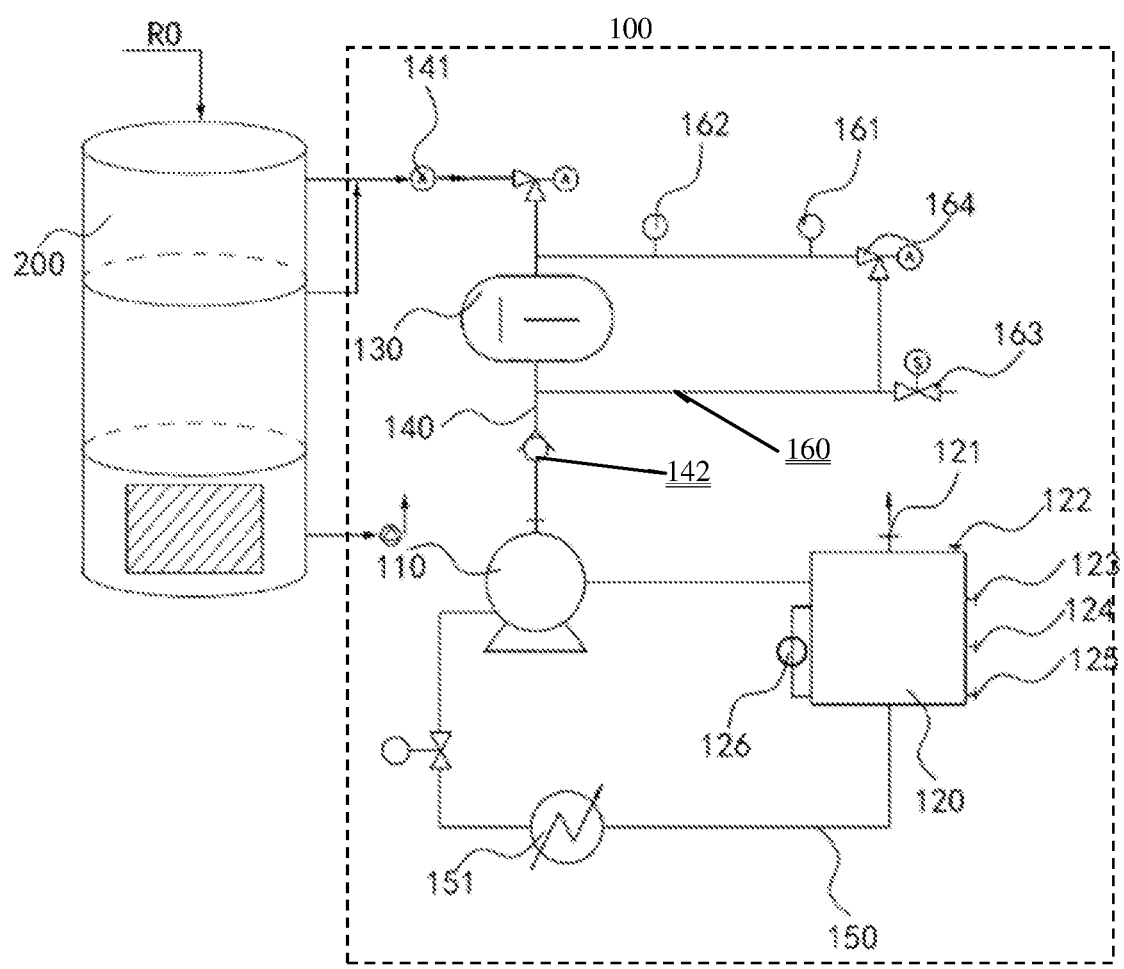
FIG. 2 is a schematic diagram of a vacuum degassing tower according to an embodiment of the present disclosure.

Referring to FIG. 2, a schematic diagram of a vacuum degassing tower according to an embodiment of the present disclosure is shown. According to the embodiment, for example, the vacuum degassing tower is applied to a water system. It will be understood by those skilled in the art that various modifications, additions, substitutions, deletions or other modifications may be made to the specific embodiments described below in order to apply the related designs of the present disclosure to other types of purification systems or other technologies will still be within the scope of the principles of the vacuum degassing tower disclosed in embodiments of the present disclosure.

As shown in FIG. 2, according to the present embodiment, the vacuum degassing tower may include a tower body 200 and a degassing system. Specifically, the top of the tower body 200 is connected with an upstream equipment (e.g., RO) through a pipeline, and the bottom of the tower body 200 can store the dehydrated liquid and output it to the downstream equipment through a pipeline with a combination of pumps. The degassing system is the pump-assisted degassing system 100 disclosed in the present disclosure and described in detail in the above embodiments.

As shown in FIG. 2, according to the present embodiment, the pump-assisted degassing system 100 may include a vacuum pump 110, a gas-liquid separator 120, and a booster pump 130. The vacuum pump 110 is connected with the upper portion of the tower body 200 through the main pipeline 140, and is configured to pump out a gas-liquid mixture from the tower body 200 through the main pipeline 140. The gas-liquid separator 120 is connected with the vacuum pump 110 in a closed loop through the circulation pipeline 150, and is configured to perform gas-liquid separation on the gas-liquid mixture pumped out by the vacuum pump 110. For example, the gas-liquid separator 120 can remove the $CO_2$ gas from the gas-liquid mixture, thereby avoiding the influence of the $CO_3^{2-}$ on the water quality in the subsequent processes. The booster pump 130 is disposed on the main pipeline 140, and is located between the vacuum pump 110 and the tower body 200. The booster pump 130 is configured to provide assist when the vacuum pump 110 pumps the gas-liquid mixture from the tower body 200 through the main pipeline 140.

Further, as shown in FIG. 2, according to the present embodiment, the booster pump 130 is connected with a vacuum pipeline 160 in a closed loop, and is provided with a selective vacuum device to ensure a vacuum environment for pumping the gas-liquid mixture by the booster pump 130. Specifically, the vacuum pipeline 160 is provided with a vacuum switch 161, a vacuum gauge 162, a vacuum breaking valve 163, and a bypass valve 164.

Further, as shown in FIG. 2, according to the present embodiment, the main pipeline 140 is provided with an inlet valve 141 located between the booster pump 130 and the tower body 200. Accordingly, the pump-assisted degassing system 100 can control the connection between the entire system 100 and the tower body 200 through the inlet valve 141, thereby selectively achieving the degassing function.

Further, as shown in FIG. 2, according to the present embodiment, the main pipeline 140 is provided with a check valve 142 located between the booster pump 130 and the vacuum pump 110. The check valve 142 is configured to stop backflow of the main pipeline 140 from the vacuum pump 110 to the booster pump 130.

Further, as shown in FIG. 2, according to the present embodiment, a cooler 151 is provided on the circulation pipeline 150. The cooler 151 is configured to cool the gas-liquid mixture circulating between the vacuum pump 110 and the gas-liquid separator 120 through the circulation pipeline 150.

It should be noted that the vacuum degassing towers illustrated in the drawings and described in the specification are just a few examples of the many types of vacuum degassing towers that can employ the principles of the present disclosure. It should be clearly understood that the principles of the present disclosure are not merely limited to any detail of the vacuum degassing tower shown in the drawings or described in the specification or any component of the vacuum degassing tower.

Embodiment of Pure Water System

Based on the above description of the pump-assisted degassing system and the vacuum degassing tower including the system, an embodiment of the water system disclosed by the present disclosure will be described below.

According to the present embodiment, the water system proposed by the present disclosure includes a vacuum degassing tower disclosed by the present disclosure and described in detail in the above embodiments.

It should be noted that the water system illustrated in the drawings and described in the specification is only a few examples of many types of pure water systems that can employ the principles of the present disclosure. It should be understood that the principles of the present disclosure are not merely limited to details of the water system shown in the drawings or described in the specification or any component of the water system.

In summary, the embodiments of the present disclosure provide a pump-assisted degassing system, a vacuum degassing tower, and a water system including the same. The pump-assisted degassing system includes a vacuum pump, a gas-liquid separator, and a booster pump. The vacuum pump is connected to the degassing tower to pump out the gas-liquid mixture from the degassing tower. The gas-liquid separator is connected with the vacuum pump in a closed loop to perform gas-liquid separation on the gas-liquid mixture. The booster pump is located between the vacuum pump and the degassing tower to provide assist to the vacuum pump. According to the above, the vacuum pump and the booster pump constitute a two-stage pumping device with the mechanical vacuum assist. The vacuum pump has a small amount of circulating water, and requires a small motor power. Moreover, only one vacuum pump is desired to process the gas-liquid mixture pumped out by the vacuum tower, to lower the equipment load and the loss of the operation efficiency of the blades of the vacuum pump.

Specifically, the above design in the embodiments of the present disclosure has demonstrated that, at least the following data or functions can be achieved.

1. The motor power required to drive the vacuum pump is only about 25 horsepower (i.e., 18 kW, and the current is about 25 A), which is a 45%~50% saving of electricity consumption.
2. Only one vacuum pump is required to achieve the required pressure of 25~30 Torr.
3. The required volume of the circulating cooling water is only 45 liters per minute, which is a 50%~60% saving of the volume of the cooling circulating water.
4. The cost is about 50% of that using the existing combination of pumps.

Embodiments of the pump-assisted degassing system and vacuum degassing tower and pure water system including the same are described above and/or illustrated in detail. However, embodiments of the present disclosure are not limited to the specific embodiments described herein, but rather, the components and/or steps of each embodiment can be used independently and separately from the other components and/or steps described herein. Each component and/or each step of an embodiment may also be used in combination with other components and/or steps of other embodiments. In the herein description or/and illustration of the elements/components/etc., the terms "one", "the" etc. are used to indicate the presence of one or more elements/components/etc. The terms "comprising", "including" and "having" are used for open-ended mode, which means additional elements/components or the like can also be provided or included in addition to the listed elements/components/etc. Moreover, the terms "first" and "second" and the like in the claims and the description are used only as a mark, not a numerical limit to the corresponding objects.

While the pump-assisted degassing system and the vacuum degassing tower and pure water system including the same have been described in terms of various specific embodiments, those skilled in the art may realize that the implementation of the present disclosure can be modified within the spirit and scope of the claims.

What is claimed is:

1. A pump-assisted degassing system, comprising:
   a vacuum pump, connected with a degassing tower through a main pipeline, and configured to pump out a gas-liquid mixture from the degassing tower;
   a gas-liquid separator, connected with the vacuum pump in a closed loop through a circulation pipeline, and configured to perform gas-liquid separation on the gas-liquid mixture; and
   a booster pump, arranged on the main pipeline between the vacuum pump and the degassing tower, and configured to assist the vacuum pump to pump out the gas-liquid mixture.

2. The pump-assisted degassing system of claim 1, wherein the booster pump is connected with a vacuum pipeline in a closed loop, and the vacuum pipeline is provided with a vacuum switch.

3. The pump-assisted degassing system of claim 2, wherein the vacuum pipeline is provided with a vacuum gauge.

4. The pump-assisted degassing system of claim 2, wherein the vacuum pipeline is provided with a vacuum breaking valve.

5. The pump-assisted degassing system of claim 2, wherein the vacuum pipeline is provided with a bypass valve.

6. The pump-assisted degassing system of claim 3, wherein when the vacuum gauge shows an abnormal vacuum pressure, the vacuum switch operates to discharge water from the vacuum pipeline through a bypass valve and a vacuum breaking valve.

7. The pump-assisted degassing system of claim 1, wherein the main pipeline is provided with an inlet valve arranged between the booster pump and the degassing tower to control the connection therebetween.

8. The pump-assisted degassing system of claim 1, wherein the main pipeline is provided with a check valve arranged between the booster pump and the vacuum pump to stop backflow from the vacuum pump to the booster pump.

9. The pump-assisted degassing system of claim 1, wherein the circulation pipeline is provided with a cooler to cool the gas-liquid mixture.

10. The pump-assisted degassing system of claim 1, wherein the gas-liquid separator includes a liquid level gauge to maintain a water level of the gas-liquid separator.

11. The pump-assisted degassing system of claim 1, wherein a required motor power of the vacuum pump is no more than 25 horsepower.

12. The pump-assisted degassing system of claim 1, wherein a required volume of circulating cooling water of the pump-assisted degassing system is 45 liters per minute.

13. A vacuum degassing tower, comprising:
a tower body; and
a degassing system, comprising:
a vacuum pump, connected with a degassing tower through a main pipeline, and configured to pump out a gas-liquid mixture from the degassing tower;
a gas-liquid separator, connected with the vacuum pump in a closed loop through a circulation pipeline, and configured to perform gas-liquid separation on the gas-liquid mixture; and
a booster pump, arranged on the main pipeline between the vacuum pump and the degassing tower, and configured to assist the vacuum pump to pump out the gas-liquid mixture,
wherein the vacuum pump is connected with an upper portion of the tower body, and is configured to pump out the gas-liquid mixture from the tower body, and wherein the booster pump is arranged between the vacuum pump and the tower body.

14. The vacuum degassing tower of claim 13, wherein booster pump is connected with a vacuum pipeline in a closed loop, and the vacuum pipeline is provided with a vacuum switch.

15. The vacuum degassing tower of claim 14, wherein the vacuum pipeline is provided with a vacuum gauge.

16. The vacuum degassing tower of claim 14, wherein the vacuum pipeline is provided with a vacuum breaking valve.

17. The vacuum degassing tower of claim 14, wherein the vacuum pipeline is provided with a bypass valve.

18. The vacuum degassing tower of claim 15, wherein when the vacuum gauge shows an abnormal vacuum pressure, the vacuum switch operates to discharge water from the vacuum pipeline through a bypass valve and a vacuum breaking valve.

19. The vacuum degassing tower of claim 13, wherein the main pipeline is provided with an inlet valve arranged between the booster pump and the degassing tower to control the connection therebetween.

20. A water system, comprising:
a vacuum degassing tower, comprising:
a tower body, and
a degassing system, comprising:
a vacuum pump, connected with a degassing tower through a main pipeline, and configured to pump out a gas-liquid mixture from the degassing tower;
a gas-liquid separator, connected with the vacuum pump in a closed loop through a circulation pipeline, and configured to perform gas-liquid separation on the gas-liquid mixture; and
a booster pump, arranged on the main pipeline and between the vacuum pump and the degassing tower, and configured to assist the vacuum pump to pump out the gas-liquid mixture,
wherein the vacuum pump is connected with an upper portion of the tower body, and is configured to pump out the gas-liquid mixture from the tower body, and wherein the booster pump is arranged between the vacuum pump and the tower body.

* * * * *